April 20, 1971  J. M. PEZELY  3,575,781
PLASTIC FILM WRAPPING MATERIAL
Filed May 16, 1969
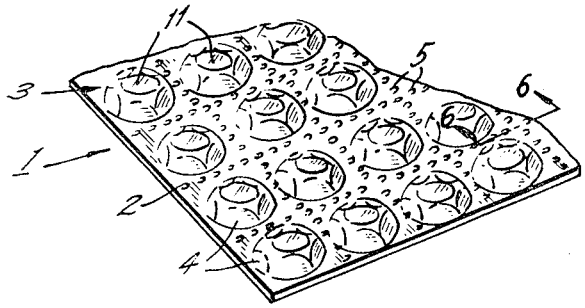
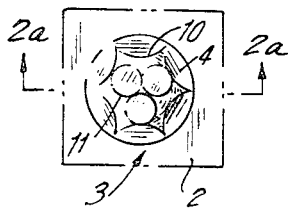
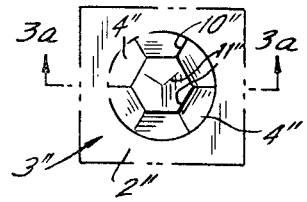
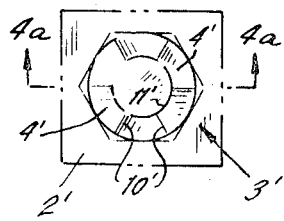
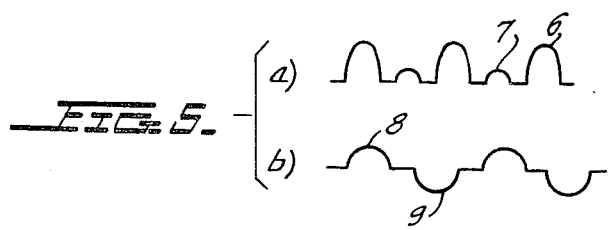
INVENTOR.
JOSEPH M. PEZELY
BY Daniel C. Block United States Patent Office 3,575,781
Patented Apr. 20, 1971

3,575,781
PLASTIC FILM WRAPPING MATERIAL
Joseph M. Pezely, Newark, Del., assignor to Stauffer Hoechst Polymer Corporation, Delaware City, Del.
Filed May 16, 1969, Ser. No. 825,254
Int. Cl. B32b 3/30; B65d 65/02, 65/38
U.S. Cl. 161—131
12 Claims

ABSTRACT OF THE DISCLOSURE

Transparent film wrapping material having hemispherical protuberances spaced thereon is described herein. Each of the protuberances is provided with a plurality of facets thereon to provide ridges therebetween that will disperse a crushing force in several different resultant directions. Thus, the wrapping material absorbs the shock and maintains the item wrapped therein in a safe condition.

BACKGROUND OF THE INVENTION

In shipping commodities from one location to another, it is the practice to place the commodity within a shipping container or other like container with shock-absorbing material placed therearound. The shock-absorbing material can be in the form of loosely packed chips of plastic material such as cut-up polystyrene or other foam material, or in the form of excelsior material which is paper cut up into strips. Other types of cushion material include straw with short or long length fibers, either synthetic or natural. While these materials have been used for many years, there are several drawbacks encountered therewith. For one thing, most of these materials are dusty and cannot be used for packaging some commodities. Also, they absorb moisture which is an undesirable feature in a cushioning or shock-absorbing material. Moreover, large volumes of material are needed, thus requiring large volumes of space for storage for immediate use.

With the advent of plastic films, highly flexible polyethylene laminates have been employed for packaging materials. This would include at least two films laminated together with one film being provided with air pockets therein. Other types of film material include bags having protuberances in the form of conical shaped protuberances thereon for packaging material. Generally, these film materials do not absorb the shock as readily as the loosely packed excelsior. Thus, they have not been notably successful for replacing the same. Moreover, large volumes of space are needed to store the film material prior to use.

BRIEF DESCRIPTION OF THE INVENTION

It has been discovered that a film material formed with hemispherical protuberances thereon can be readily used cludes a die having a proper cavity to form the protuberances have formed thereon a plurality of facets with the space between respective facets provided with rigid lines of resistance which function to scatter shock into several different directions thus cushioning the force onto the items packed therein. Relatively small space is taken up for storing this material since it readily nests with several different sheets. Thus, the necessary storage requirement is substantially reduced. Moreover, the film material itself is made of unplasticized polyvinyl chloride film which does not absorb moisture, is not deteriorated by or support fungus and does not discolor or fade during use.

BRIEF DESCRIPTION OF THE DRAWINGS

FIG. 1 is a perspective view of the film packaging material of the present invention illustratingt he hemispherical protuberances and facets thereon.

FIG. 2 is a plan view of one of the facets of the film of FIG. 1.

FIG. 2A is a cross-sectional view taken on the line 2A—2A of FIG. 2.

FIG. 3 is a plan view of a modified hemispherical protuberance with facets thereon.

FIG. 3A is a cross-sectional view taken along line 3A—3A of FIG. 3.

FIG. 4 is yet another modification of the hemispherical proturberances having facets thereon.

FIG. 4A is a cross-sectional view taken along line 4A—4A of FIG. 4.

FIG. 5 is a schematic illustration of two different types of hemispherical protuberances that are embodied within the present invention.

FIG. 6 is a cross-sectional view taken along the line 6—6 of FIG. 1.

DETAILED DESCRIPTION OF THE INVENTION

In the practice of the present invention, the packaging material 1 of the present invention is formed from a sheet of unplasticized polyvinyl chloride 2. The sheet 2 can be manufactured in any conventional manner such as by rolling, milling, extruding or the like. It is suffice to say that the film 2 is transparent and can range in thickness between 2 and 8 mils, preferably around 5 mils in thickness. Protuberances 3 are then formed in the film 2 by a thermo-forming process. The thermoforming process includes a die having the proper cavity to form the protuberances 3 therein and includes heating the film and then subjecting it to a vacuum and/or pressure to form protuberances 3. The protuberances 3 are uniformly spaced throughout the sheet 2 and are of a hemispherical configuration. Between each protuberance 3 are formed additional protuberances 5 which enhances the flexibility of the packaging material 1. The protuberances 3 can range in depth between about 1/8" and 1/2". The depth will be selected for the particular product to be packed and shipped.

Each of the protuberances 3 on the polyvinyl chloride film 2 is provided with a plurality of uniform size facets 4. A plurality of ridges indicated at 10 and 11 in FIG. 2 are shown between each ofthe facets 4. These ridges 10 and 11 are lines of rigidity and serve to disperse an impact force in several different directions so that the commodity that is packaged will not be injured. As shown in FIG. 2, the facets 4 are of a circular configuration. The facets 4 are uniform in size and evenly spaced on the protuberances 3.

Referring to FIGS. 3 and 4, the protuberances 3' and 3" are of a hemispherical configuration by the facets 4' and 4" have straight sides to form ridges 10' and 10" and ridges 11' and 11". Referring now to FIG. 5, the hemispherical configurations in FIG. 5A are depicted as being alternately one larger and one smaller by the numerals 6 and 7. In FIG. 5B, the hemispherical protuberances extend in opposite directions as indicated by the numerals 8 and 9.

In use of the product of the present invention, the packing or cushioning material 1 of the present invention can be used in sheet form by simply wrapping the items to be shipped or can be used between tiers within a regular slotted carton. Also, since the unplasticized polyvinyl chloride film can be taped, stapled, ultrasonically sealed, heat sealed or glued, bags can be made therefrom with the items to be shipped placed therein. Additionally, the unplasticized polyvinyl chloride sheets with protuberances formed thereon in accordance with the present invention can be cut into strips and used for loose-fill packaging if such an expedient is so desired. The packaging material has clear advantages over those known in the art. The advantages are that the sheets will nest during shipment to the consumer which will take up less warehouse space and will save delivery costs. Moreover, lower labor costs are involved due to the nesting. Additionally, the product of the present invention will not deteriorate or support fungus, will not absorb moisture and does not discolor or fade and is self-extinguishing as opposed to paper, styrene or polyethylene which are highly flammable. The packaging material cushions all frangible items packed therein. Since the material is transparent, the user can see how much protection there is between items in a multiple pack. Moreover, the product does not scuff or abrade the items being packed, will not collect dust, shed or fragment and performs well at temperatures between $-40$ to $110°$ F.

In order to illustrate the merits of the present invention, the following examples are provided:

EXAMPLES 1 to 8

The performance of the packaging material is illustrated in several different uses.

| | Test | Sample | Technique | Results |
|---|---|---|---|---|
| Example: | | | | |
| 1 | Drop | Bag | 36″ drop on concrete. | Lightbulb did not break. |
| 2 | do | Bag | do | Wristwatch did not break or stop. |
| 3 | do | Sheet | do | Lightbulb did not break. |
| 4 | Compression | ½″ x 8″ sheet | Tinius Olsen Tensile Machine. | Stronger than conventional packaging materials. |
| 5 | Dart impact | 7″ x 7″ sheet | Custom Scientific Impact Tester. | Do. |
| 6 | Tensile | ½″ x 8″ sheet | Tinius Olsen Tensile Machine. | Do. |
| 7 | Drop | Bags in box | 40″ drop on concrete | Padlock and bottle did not break. |
| 8 | do | Sheet in box | 30″ drop on concrete | 2 water-filled glass bottles did not break. |

Each test was repeated a sufficient number of times to prove consistent and typical performance. As can be seen from these tests, the material of this invention performs in a manner superior to proven, conventional packaging materials.

What is claimed is:

1. A shock absorbing material for wrapping items to be shipped comprising an unplasticized polyvinyl chloride film, said film being provided with a plurality of hemispherical protuberances therein; the improvement comprising forming a plurality of facets on each of said protuberances to provide ridges between each facet.

2. The shock absorbing material as set forth in claim 1 wherein said film ranges in thickness between about 2 and 8 mils.

3. The shock absorbing material as set forth in claim 1 wherein the depth of each protuberance ranges between ⅛″ and ½″.

4. The shock absorbing material as set forth in claim 1 wherein each facet is of an essentially circular configuration.

5. The shock absorbing material as set forth in claim 1 wherein each facet is of a regular configuration.

6. The shock absorbing material as set forth in claim 1 wherein adjacent protuberances are of different size.

7. The shock absorbing material as set forth in claim 1 wherein adjacent protuberances extend in an opposite direction.

8. The shock absorbing material as set forth in claim 1 wherein means are provided between protuberances to enhance bending of said film.

9. The shock absorbing material as set forth in claim 1 wherein said film is about 5 mils in thickness.

10. The shock absorbing material as set forth in claim 1 wherein said film is used in the form of sheets.

11. The shock absorbing material as set forth in claim 1 wherein said film is in the form of prefabricated bags.

12. The shock absorbing material as set forth in claim 1 wherein said film is in the form of small cut-up areas for loose-fill packing purposes.

References Cited

UNITED STATES PATENTS

| | | | |
|---|---|---|---|
| 1,958,050 | 5/1934 | Koppelman | 161—131X |
| 2,221,310 | 11/1940 | Gazelle | 161—127 |
| 3,018,015 | 1/1962 | Agriss et al. | 161—130 |
| 3,086,899 | 4/1963 | Smith et al. | 161—131X |
| 3,142,599 | 7/1964 | Chavannes | 161—131X |
| 3,508,992 | 4/1970 | Chavannes | 156—220X |

WILLIAM A. POWELL, Primary Examiner

U.S. Cl. X.R.

161—164; 206—45.33